US010497395B2

(12) United States Patent
Moses

(10) Patent No.: US 10,497,395 B2
(45) Date of Patent: Dec. 3, 2019

(54) UNITARY HUB TAPE SPOOL

(71) Applicant: Sony Corporation, Tokyo (JP)

(72) Inventor: Jason E. Moses, Breckenridge, MN (US)

(73) Assignee: Sony Corporation, Tokyo (JP)

( * ) Notice: Subject to any disclaimer, the term of this patent is extended or adjusted under 35 U.S.C. 154(b) by 559 days.

(21) Appl. No.: 13/796,245

(22) Filed: Mar. 12, 2013

(65) Prior Publication Data

US 2013/0284842 A1     Oct. 31, 2013

Related U.S. Application Data

(60) Provisional application No. 61/638,789, filed on Apr. 26, 2012.

(51) Int. Cl.
| | |
|---|---|
| *G11B 23/04* | (2006.01) |
| *B65H 75/50* | (2006.01) |
| *G11B 23/037* | (2006.01) |
| *B23P 15/00* | (2006.01) |
| *G11B 23/107* | (2006.01) |
| *B65H 75/14* | (2006.01) |

(52) U.S. Cl.
CPC ............ *G11B 23/044* (2013.01); *B23P 15/00* (2013.01); *B65H 75/14* (2013.01); *B65H 75/50* (2013.01); *G11B 23/037* (2013.01); *G11B 23/107* (2013.01); *B65H 2701/5124* (2013.01); *Y10T 29/4956* (2015.01); *Y10T 29/49556* (2015.01)

(58) Field of Classification Search
CPC .................. B65H 75/50; B65H 75/14; B65H 2701/5124; G11B 23/107; G11B 23/037; G11B 23/044; Y10T 29/4956; Y10T 29/49556
USPC ...... 242/610, 610.5, 332, 332.4, 348, 348.2, 242/532.6
See application file for complete search history.

(56) References Cited

U.S. PATENT DOCUMENTS

| | | | |
|---|---|---|---|
| 3,758,045 A | * | 9/1973 | Allen ...................... B65H 75/14 242/125.2 |
| 5,029,771 A | * | 7/1991 | Ranoia ........................ 242/546.1 |
| 5,813,622 A | * | 9/1998 | von Alten ............ G11B 23/107 242/338.1 |
| 5,876,525 A | * | 3/1999 | Prechtel et al. .............. 148/690 |
| 6,345,779 B1 | | 2/2002 | Rambosek |
| 6,480,357 B1 | | 11/2002 | Rambosek |
| 6,505,789 B2 | | 1/2003 | Ridl et al. |
| 6,968,459 B1 | | 11/2005 | Morgan et al. |
| 7,123,445 B2 | | 10/2006 | Spychalla |
| 7,156,336 B2 | | 1/2007 | Morita |
| 7,168,655 B2 | | 1/2007 | Morita |
| 7,170,708 B2 | | 1/2007 | Rambosek et al. |
| 7,243,871 B2 | | 7/2007 | Moses et al. |

(Continued)

*Primary Examiner* — Sang K Kim
*Assistant Examiner* — Nathaniel L Adams
(74) *Attorney, Agent, or Firm* — K&L Gates LLP

(57) ABSTRACT

An assembly comprises a substantially cylindrical tape winding surface and first and second flanges co-formed with the winding surface to form a unitary hub structure. The tape winding surface extends along an axis from a first end to a second end, and the first and second flanges extend radially from the first and second ends of the tape winding surface, respectively. The tape winding surface and the first and second flanges are co-formed of a unitary hub material having a Young's modulus of at least about one million psi.

20 Claims, 6 Drawing Sheets

(56) References Cited

U.S. PATENT DOCUMENTS

| | | | | |
|---|---|---|---|---|
| 7,300,016 B2* | 11/2007 | Brown | ................. | G11B 23/044 |
| | | | | 242/348 |
| 7,309,040 B2* | 12/2007 | Sogabe | ................ | G11B 23/043 |
| | | | | 242/348 |
| 2001/0054662 A1* | 12/2001 | Zwettler et al. | ............... | 242/345 |
| 2005/0105210 A1* | 5/2005 | Okawa et al. | .................. | 360/93 |
| 2008/0265077 A1* | 10/2008 | Shiga | ......................... | 242/348.3 |

* cited by examiner

UNITARY HUB TAPE SPOOL

CROSS-REFERENCE TO RELATED APPLICATIONS

This application claims priority to U.S. Provisional Application No. 61/638,789, filed Apr. 26, 2012, entitled UNITARY HUB TAPE SPOOL, the entirety of which is hereby incorporated by reference herein.

BACKGROUND

Magnetic tape-based data storage systems provide secure, reliable, cost-efficient, and scalable data storage solutions for business, industry, and government service applications. In particular, magnetic tape systems provide high data storage densities and capacity, with adaptable performance criteria suitable for a wide range of backup, archiving, and portable data storage needs.

Spool and cartridge-based magnetic tape systems combine these features in a practical, convenient, and accessible format for use in regulated bulk storage environments. Tape spools and cartridges can also be employed with a range of online, nearline, offline, and offsite infrastructures, in order to relay large datasets, ensure regulatory compliance, and safeguard critical information while lowering data storage costs and access time.

Across this wide range of magnetic storage applications, increasing engineering demands are continually made on the tape cartridge and spool systems, including not only the tape medium itself but also the spool and hub assembly. In particular, the spool and hub components are subject to considerable compressive loading based on the tension in the tape pack windings, and this loading may vary significantly as a function of temperature, humidity, and other environmental factors.

At the same time, tape cartridge and spool systems must also provide highly accurate speed and position control, for precision response to start, stop, and read/write commands. These considerations place substantial design demands on the tape storage system, tape spool, and hub assemblies.

SUMMARY

Exemplary embodiments of the present disclosure include a tape hub assembly, a tape spool and a method for making a tape spool. The tape hub assembly may include a tape winding surface extending along an axis from a first end to a second end, with first and second flanges extending radially from the first and second ends, respectively. The first and second flanges may be co-formed with the winding surface to form a unitary hub structure, and the unitary hub structure may be formed of material having a Young's modulus of at least about one million psi.

The tape spool may include a substantially cylindrical winding surface formed of a metal material, a first flange formed of the metal material and extending radially from a first end of the winding surface, and a second flange formed of the metal material and extending radially from a second end of the winding surface. The winding surface, the first flange and the second flange may be co-formed of the metal material to form a unitary hub structure.

The method may comprise forming a substantially cylindrical winding surface extending along an axis from a first end to a second end, co-forming a first flange extending radially from the first end of the winding surface, and co-forming a second flange extending radially from the second end of the winding surface. The winding surface, the first flange and the second flange may be co-formed of a metal material having an elastic modulus of at least about five million psi.

In any of the exemplary apparatus, tape spool and method embodiments, a tape may be wound about the winding surface of the unitary hub, between the first and second flange. The tape may impose a compressive load of at least about 500 psi on the winding surface, and the winding surface may have a maximum radial deformation of less than about one mil, when subject to the compressive load.

DETAILED DESCRIPTION

Figure 1:
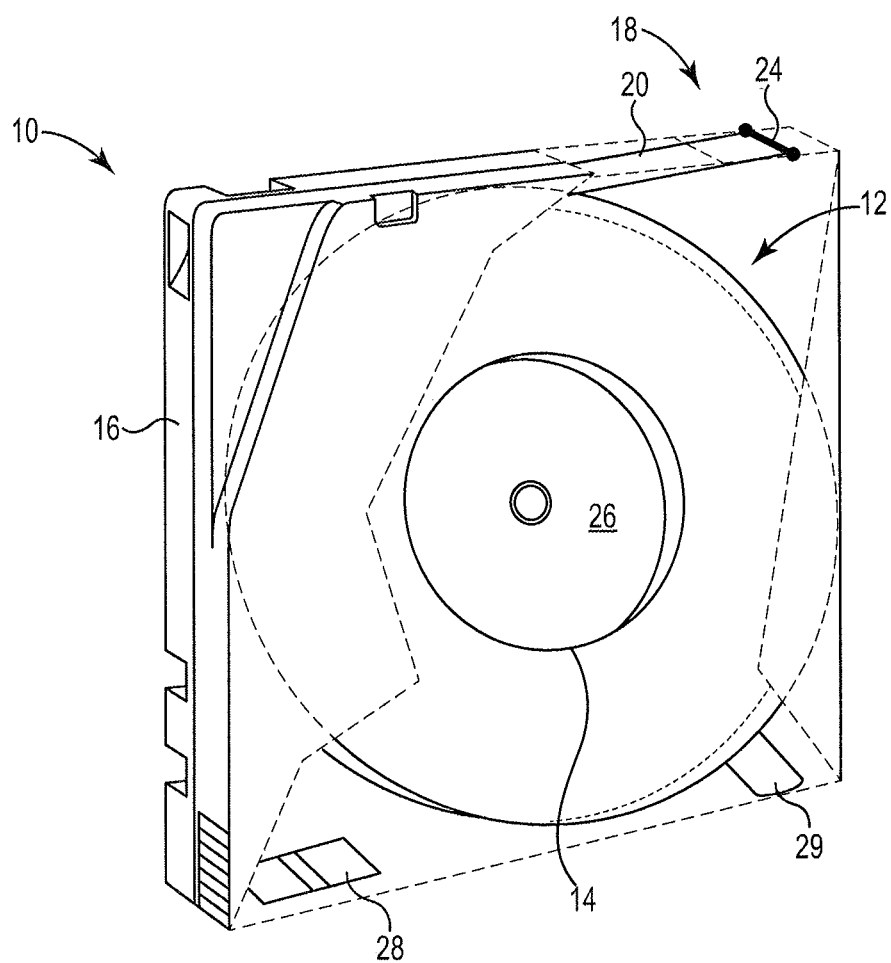
FIG. 1 is a cutaway view of a tape-based data storage system with a unitary hub spool assembly.

FIG. 1 is a schematic illustration of magnetic tape-based data storage system 10 with spool assembly 12 and unitary hub 14. In this particular example, data storage system 10 is configured as a cartridge-type magnetic tape system with case or shell 16 and access 18 for tape-based magnetic medium 20. Tape medium 20 is wrapped on spool assembly 12 with unitary hub 14 for improved performance under tension and compression loading, over a range of different environmental and operating conditions.

Access 18 provides a gate, slide, window, or other access opening for tape medium 20. In some designs, including, but not limited to, Linear Tape-Open (LTO) configurations, tape medium 20 is wound on a single reel or spool assembly 12, and leader pin 24 is provided for coupling to a separate take-up reel inside the tape drive. Alternatively, a two-reel system 10 may be provided, with separate supply and take-up spool assemblies 12, or an endless loop design may be used for tape medium 20 and spool assembly 12.

Tape system 10 and spool assembly 12 may also include additional features such as spring-loaded or biased positioning elements in cavity 26, switchable write protect tab 28 and memory chip 29, for example an RF (radio frequency) access memory device for system identification, configuration, formatting, tape usage, and other user data. These and other representative features of cartridge-based tape system 10 are described in the following U.S. patent documents, for example as assigned to Imation Inc. of Oakdale, Minn., each of which incorporated by reference herein: Rambosek, U.S. Pat. No. 6,345,779; Rambosek, U.S. Pat. No. 6,480,357; Ridl et al., U.S. Pat. No. 6,505,789; Morgan et al., U.S. Pat.

No. 6,968,459; Spychalla, U.S. Pat. No. 7,123,445; Rambosek et al., U.S. Pat. No. 7,170,708; Moses et al., U.S. Pat. No. 7,243,871; and Brown et al., U.S. Pat. No. 7,300,016.

Alternatively, spool assembly 12 and unitary hub 14 may also be provided independently of or separately from case shell 16, and the other components of cartridge-based data storage system 10. Magnetic medium or tape 20 also takes a variety of forms, including, but not limited to, digital data storage tape, audio and video tape for analog or digital recording, and other tape-based magnetic media formats including, but not limited to, Linear Tape-Open, Scalable Linear Recording (SLR), T10,000, 9840, 9940, 3592, 3590, 3570, and other digital data standards.

As suitable for each of these applications, tape medium 20 may be formed by binding a magnetic coating to a substrate or base film, for example a polymer such as polyethylene terephthalate (PET) or polyethylene naphthalate (PEN). A back coat may be applied to the surface opposite the magnetic coating, for example silicon dioxide or carbon black pigment particles (or both), with a blend of polymer resin or nitrocellulose binders to provide stiffness, reduce friction, dissipate static charge, and maintain uniform tape wind. It should be recognized, however, that the present invention may also be used with any suitable type of tape or any suitable type of media, as desired, including, but not limited to, audio, video and data-based media for digital and analog recording.

In operation of recording system 10, tape medium 20 may impose substantial stresses and strains on spool assembly 12 and hub 14. In particular, tension loading on tape-based media 20 may generate considerable layer-to-layer pressure within spool assembly 12, resulting in significant compressive and other stresses on the winding surface of hub 14. Changes in temperature, humidity, and other environmental conditions can also cause the backer (substrate) and other components of tape medium 20 to expand or contract, generating asymmetric or time-variable stress and strain components.

Stresses and strains on spool assembly 12 can lead to deformation of hub 14, and contribute to tape wind issues including cinching, pack slip, spoking, windowing, and layer-to-layer adhesion. To reduce these effects and improve performance, a substantially one-piece, unitary design can be employed for hub 14, as described below, with a high rigidity, high stiffness hub material to provide increased service life and improved reliability over a wider range of environmental and operating conditions.

Figure 2A:
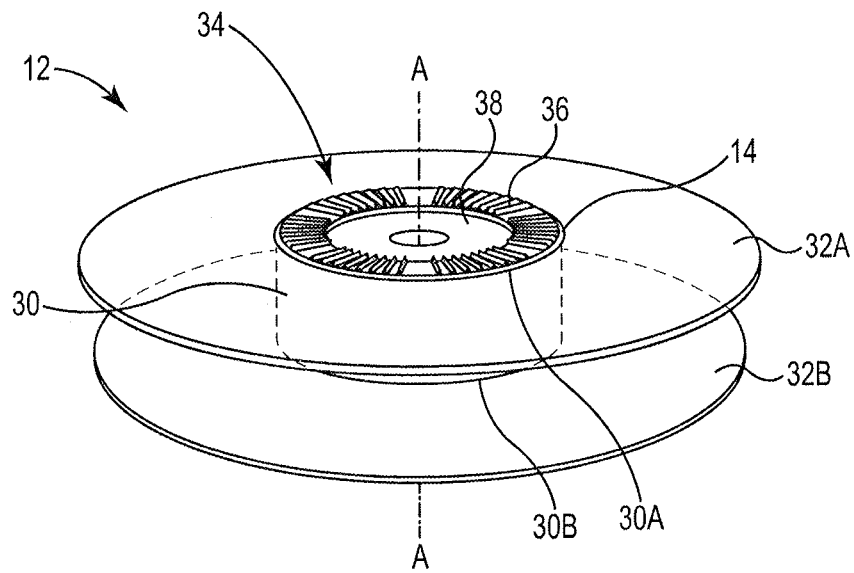
FIG. 2A is a perspective view of a spool assembly with a unitary hub and coupling insert.

FIG. 2A is a perspective view of spool assembly 12 with unitary hub 14. Hub 14 includes an external winding surface on hub cylinder 30 and constraint surfaces or flanges 32A and 32B, which may be co-formed with hub cylinder 30 to provide a unitary spool hub 14. Spool assembly 12 may also include insert 34 with additional features such as coupling element 36 and magnetic washer or clutch element 38, as configured to rotationally couple hub 14 to a tape drive or other mechanism for rotation of spool assembly 12.

Hub cylinder 30 forms a substantially cylindrical winding surface with first and second ends 30A and 30B arranged along rotational axis A. Tape medium 20 may be wound onto the outer (winding) surface of hub cylinder 30 between flanges 32A and 32B, forming a wound tape pack as described above.

Flanges 32A and 32B form generally parallel, substantially circular or disc shaped surfaces, coaxially arranged along axis A of spool assembly 12 and extending radially from first and second ends 30A and 30B of hub cylinder 30, respectively. Hub cylinder (or winding surface) 30 extends coaxially along axis A, between first flange 32A and second flange 32B.

Hub cylinder 30 and flanges 32A and 32B are formed (or co-formed) of a substantially unitary material, and provided as a single piece or unitary spool hub 14. Thus, unitary hub 14 may be provided as a "blank" spool, with necessary interchange items provided via insert 34, for example by molding coupling element 36 and the other components of insert 34 from plastic or other material, and attaching magnetic washer 38, as described below.

To reduce deformation under compressive loading, hub cylinder 30, flanges 32A and 32B, and the other components of unitary hub 14 are formed of a strong, durable, high stiffness material that is resistant to stress and strain. In some designs, for example, unitary hub 14 is formed of a metal injection molded (MIM) material such as magnesium, or a magnesium alloy. Other materials may also be used, including, but not limited to, aluminum, magnesium, titanium, steel and nickel-based metals and metal alloys, formed by one or more injection molding, powder metallurgy, sintering, casting and rapid machining techniques.

Traditional machining methods may also be employed, either for finish machining of unitary hub 14 or to manufacture hub 14 from a metal forging or other workpiece. In addition, one or more coatings can be applied to reduce oxidation or corrosion, or to reduce friction between hub 14 and the cartridge case.

The unitary, stress resistant structure of hub 14 provides spool assembly 12 with a more uniform tape winding surface along hub cylinder 30, with substantially symmetric radius and other geometric properties for improved winding of magnetic tape and other storage media. Flanges 32A and 32B are also formed of substantially the same material as hub cylinder 30, providing improved dimensional stability and tighter (more accurate) spacing tolerance with respect to the storage medium, for less tape rub and improved service life.

To provide unitary hub 14 with suitable levels of stiffness and resistance to stress and strain, materials with relatively high elastic or tensile modulus may be used. In particular, unitary hub 14 may be formed of a material with a particular elastic or tensile modulus, for example a Young's modulus, shear modulus, bulk modulus, elasticity or modulus of rigidity, where the modulus is selected to reduce deformation of the winding surface and deflection of flanges 32A and 32B when subject to compressive stress or strain from multiple layers of a magnetic tape winding, or other operationally-induced stress or strain.

Depending on application, the material of unitary hub 14 may thus have an elastic or strain modulus of about a million psi (1 Mpi, or about 6.9 GPa) or more, for example a metal or other material with a Young's modulus of about $1.5 \times 10^6$ psi (about 10 GPa) or more, or about $2.9 \times 10^6$ to about $3.6 \times 10^6$ psi (about 20-25 GPa) or more. In one such application, the material of unitary hub 14 may have an elastic or strain modulus of about 5 million psi (about 34 GPa) or more, for example magnesium or a magnesium alloy (or other material) with a Young's modulus of about $6.5 \times 10^6$ psi, or about 45 GPa.

Alternatively, the material of unitary hub 14 may have somewhat higher elastic or strain modulus of about $7.3 \times 10^6$ psi (about 50 GPa) or more, for example aluminum or an aluminum alloy (or other material) with a Young's modulus of about $10 \times 10^6$ psi (about 69 GPa), or titanium or a titanium alloy (or other material) with a Young's modulus of about $15 \times 10^6$ to about $17 \times 10^6$ psi (about 105-120 GPa). In additional designs, the material of unitary hub 14 may have an elastic or strain modulus greater than about 20×10⁶ psi (about 137 GPa), for example an iron or steel alloy (or other material) with a Young's modulus of up to 29×10⁶ psi (about 200 GPa) or more.

Figure 2B:
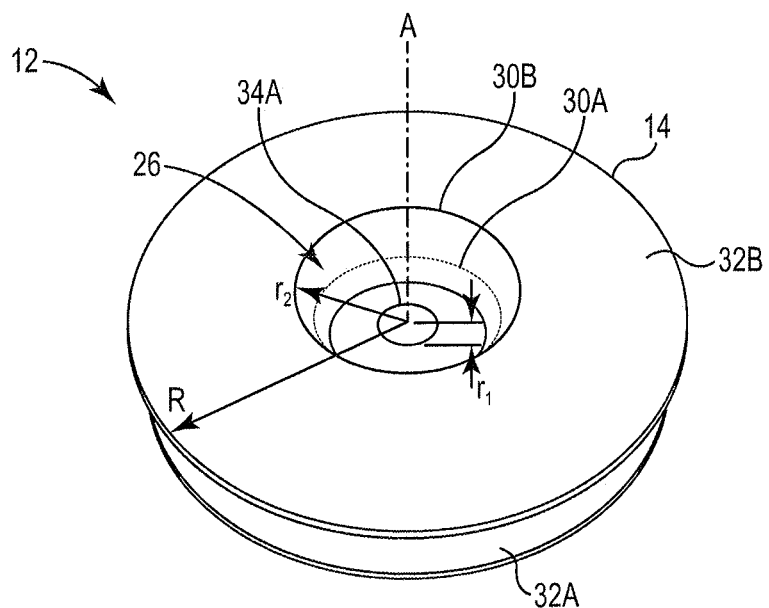
FIG. 2B is alternate perspective view of the spool assembly, showing a cavity opposite the coupling insert.

FIG. 2B is an alternate perspective view of spool assembly 12. This view shows hub cavity 26 in second end 30B of hub cylinder 30, opposite coupling insert 34 between flanges 32A and 32B.

As shown in FIG. 2A and FIG. 2B, inner portion 34A of insert 34 extends axially into flange 32A at inner radius $r_1$. Flange 32A extends radially from inner radius $r_1$ to first end 30A of hub cylinder 30, at inner hub radius $r_2$, and from inner hub radius $r_2$ at first end 30A of hub cylinder 30 to outer radius R of spool assembly 12.

Hub cavity 26 is defined in second end 30B of hub cylinder 30, extending radially from axis A of spool assembly 12 to inner radius $r_2$ of hub cylinder 30. Flange 32B extends from inner hub radius $r_2$ at second end 30B of hub cylinder 30 to major radius R of spool assembly 12.

Hub cavity 26 extends axially along the inner surface of hub cylinder 30, at inner hub radius $r_2$, from the inner surface of flange 32A at first end 30A to the outer surface of flange 32B at second end 30B. Thus, hub cylinder is closed at first end 30A and open at second end 30B. This asymmetric configuration tends to result in non-uniform radial deformation when hub 14 is subject to compression, but this effect can be reduced by the rigid, unitary construction of hub 14, as described below.

Figure 3:
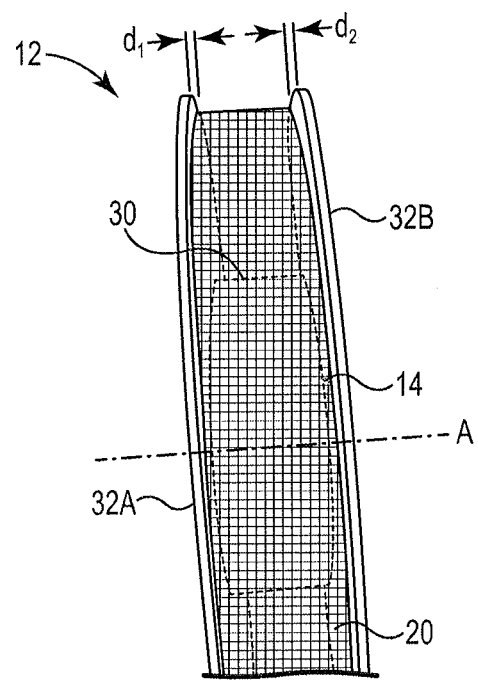
FIG. 3 is a side view of the spool assembly, showing the tape-flange spacing.

FIG. 3 is a side view of spool assembly 12, showing tape-flange spacing gaps $d_1$ and $d_2$ between tape medium 20 and flanges 32A and 32B of unitary hub 14, respectively. Gaps $d_1$ and $d_2$ are defined between the inner surfaces of flanges 32A and 32B and the adjacent edges of tape medium 20, in an axial direction along rotational axis A of spool assembly 12.

To maintain tape-flange spacing gaps $d_1$ and $d_2$ with low tolerance and high precision, flanges 32A and 32B are made of the same high strength, high elastic modulus material as hub cylinder 30, forming hub 14 as a strong, stiff, rigid, unitary structure as described above. In particular, this design reduces asymmetric radial deformation of hub cylinder 30 under compressive loading, and minimizes corresponding deflections of flanges 32A and 32B. As a result, tape-flange spacing gaps $d_1$ and $d_2$ are maintained over a wide range of operating conditions, in order to prevent, reduce or minimize tape rub and other contact interactions between tape medium 20 and flanges 32A and 32B of spool assembly 12.

Figure 4:
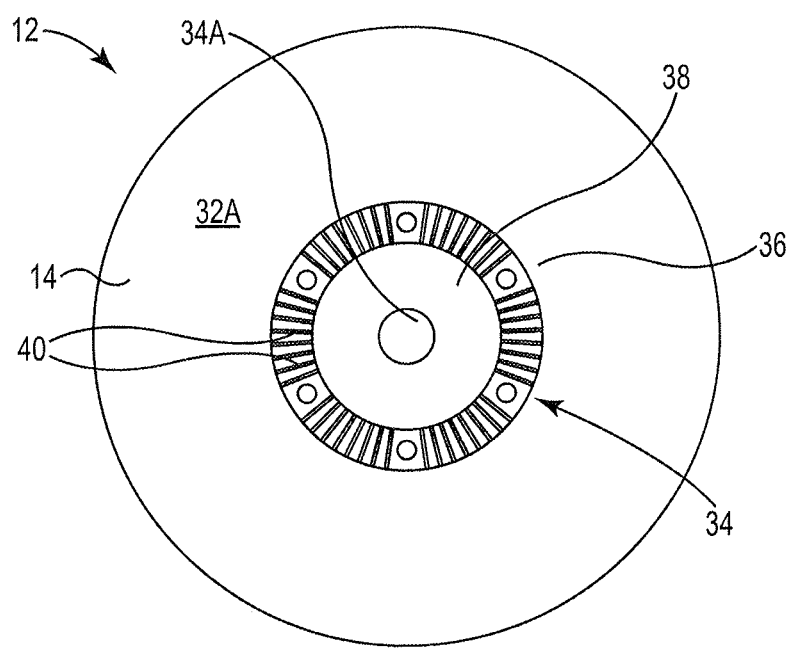
FIG. 4 is a side view of the spool assembly, showing the coupling insert.

FIG. 4 is a side view of spool assembly 12, showing coupling insert 34. In this particular example, insert 34 includes coupling element 36 and magnetic washer 38 for coupling hub 14 to a rotational drive, for example a tape drive as described above.

Depending on application, coupling element 36 may be formed with notches or teeth 40, for example from a thermoplastic or other polymer-based material, and attached to hub 14 by press fitting or using an epoxy or other bonding agent, or mechanical fasteners such as screws or pins. Alternatively, coupling element 36 may be molded or machined from the same material as flange 32A, and formed as a unitary structure with the other components of spool hub 14. In additional examples, coupling element 36 and spool hub 14 with flange 32A may be formed by an insert molding technique.

Magnetic clutch or washer element 38 is formed of a magnetic material, in order to provide a magnetic coupling to effect the mechanical attachment between coupling element 36 and a rotational drive mechanism. Depending on application, magnetic washer 38 may be press fit into mechanical coupling element 36, or attached with an adhesive or mechanical fastening. Alternatively, magnetic washer 38 may be formed as a unitary structure with the other components of spool hub 14, for example by embedding a magnetic material into the powdered metal preform or by inserting magnetic washer 38 into the injection mold, and forming unitary hub 14 as a unitary structure with magnetic washer 38 embedded within or inside unitary hub 14.

Figure 5:
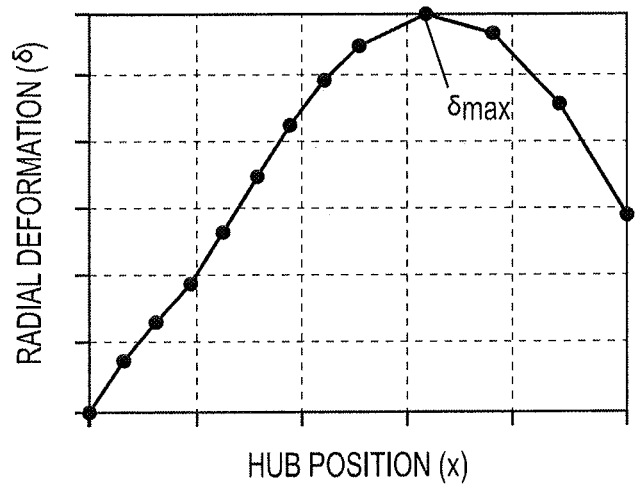
FIG. 5 is a plot of radial deformation under compressive load, as a function of hub position.

FIG. 5 is a plot of directional deformation as a function of hub position. Radial deformation δ of hub cylinder 30 is plotted along the vertical axis, in arbitrary units. Axial hub position x is given along the horizontal, and defined in arbitrary units between first flange 32A and second flange 32B.

As shown in FIG. 5, compressive loading results in asymmetric radial deformation of the hub cylinder. In one particular example using a magnesium metal material for unitary hub 14, with a Young's modulus of about 45 GPa (about 6.5×10⁶ psi), a maximum radial deflection ($δ_{max}$) of about 0.315 mil (about 8.0 μm) or less was observed, at a radial pressure of about 500 psi (about 3.4 MPa). For the same example, deflection δ was about 0.08 mil (about 2 μm) or less at the first (lower) flange (LF), adjacent the insert.

TABLE 1

Material Moduli and Radial Deformation Data

| Modulus | | Radial Pressure | | Radial Deformation | | Effective Radial Stiffness | |
|---|---|---|---|---|---|---|---|
| ×10⁶ psi | GPa | psi | MPa | mil | μm | ×10⁶ psi | GPa |
| 0.32 (UF) | 2.2 | 500 | 3.4 | 4 (max) | 100 | 0.108 | 0.7 |
| 0.74 (LF) | 5.1 | | | 0.6 (LF) | 15 | 0.722 | 5.0 |
| 6.5 | 45 | 500 | 3.4 | 0.315 (max) | 8 | 1.375 | 9.5 |
| | | | | 0.077 (LF) | 2 | 5.653 | 39 |
| 2 | 14 | 500 | 3.4 | 1.772 (max) | 45 | 0.244 | 1.7 |
| 3 | 21 | 500 | 3.4 | 1.182 (max) | 30 | 0.366 | 2.5 |
| 4 | 28 | 500 | 3.4 | 0.886 (max) | 23 | 0.489 | 3.4 |
| 5 | 34 | 500 | 3.4 | 0.709 (max) | 18 | 0.611 | 4.2 |
| 10 | 69 | 500 | 3.4 | 0.355 (max) | 9 | 1.220 | 8.4 |

This compares favorably to existing multi-part hub designs with elastic or tensile moduli (e.g., Young's modulus) below about 10⁶ psi, as shown in Table 1. For these non-uniform designs, separate moduli are given for the upper flange (UF) and lower flange (LF). The maximum radial deflection is substantially greater at the same pressure, as compared to the high stiffness, unitary design, for example about 4 mil (about 100 μm) or more, with a radial deflection of about 0.600 mil (about 15 μm) or more at the lower flange.

Table 1 also provides results for a range of uniform unitary hub compositions with representative material moduli between about 2×10⁶ psi (about 14 GPa) and about 10×10⁶ psi (about 69 GPa). These designs also exhibit maximum radial deflections below that of the existing multi-part design, for example between about 1.772 mil (about 45 μm) and about 0.355 mil (about 9 μm).

Figure 6:
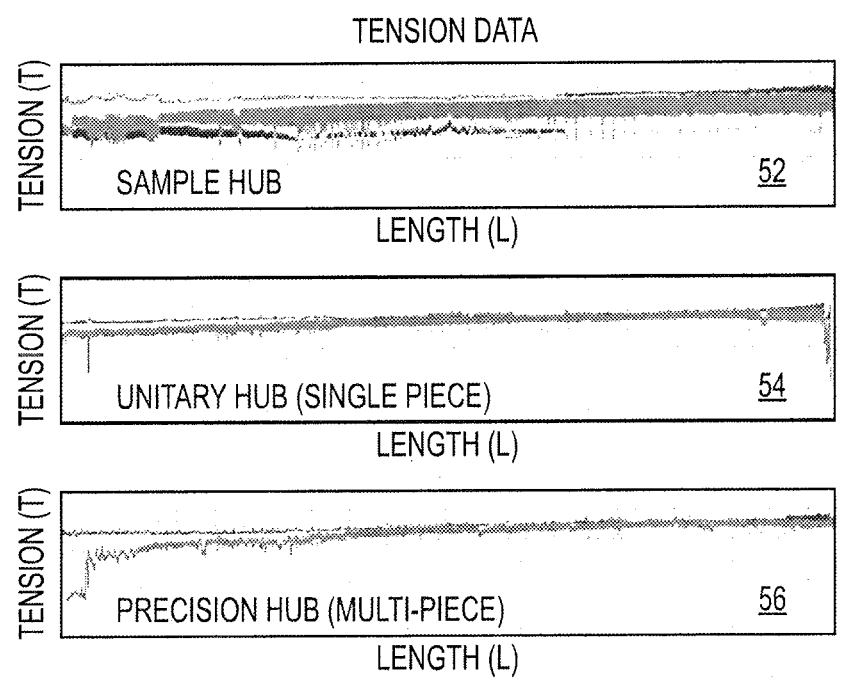
FIG. 6 is a plot of tension modulation test data for tape spools with different hub compositions.

FIG. 6 is a plot of tension modulation test data for tape spools with different hub materials. Tension T is given on the vertical axes, in arbitrary units. Tape length or position L is given on the horizontal axes, also in arbitrary units, based on the tape speed.

The standard reference or sample hub data in FIG. 6 were taken with an existing multi-piece spool and hub configuration (plot 52), and the unitary hub data were taken with a single-piece, high strength unitary hub (plot 54), as described above. The precision hub data were taken with a customized multi-piece spool and hub assembly (plot 56), made with high strength, high precision components for use on a test rig.

As shown in FIG. 6, tension T generally varies along tape length L, due to a combination of tape winding effects, deformation of the spool hub and contact (rubbing) against the flange surfaces or tape head components. For the sample hub data (plot 52), the result is a substantial variation in tension T throughout length L of the tape, with a signal-to-noise ratio of about 2:1 or about 3:1, based on a typical observed peak-to-peak variation of about 30-50%, as compared with the average tension T, or using the standard deviation over the mean.

The unitary hub data (plot 56) show a significant improvement over the existing hub design. In particular, there is less asymmetric hub deformation and corresponding flange deflection, resulting in fewer winding effects and reduced tape rub. Thus, the rigid, unitary hub data have a substantially higher signal-to-noise ratio, as compared to the existing hub design, for example about 5:1 or greater, based on a typical variation of about 20% or less of the average tension T.

The precision hub data (plot 56) are similar to the unitary hub data (plot 54). Thus, the unitary hub design compares favorably with the sample (existing) hub design, and performs approximately as well as the custom-design precision hub, at substantially reduced unit cost.

Figure 7A:
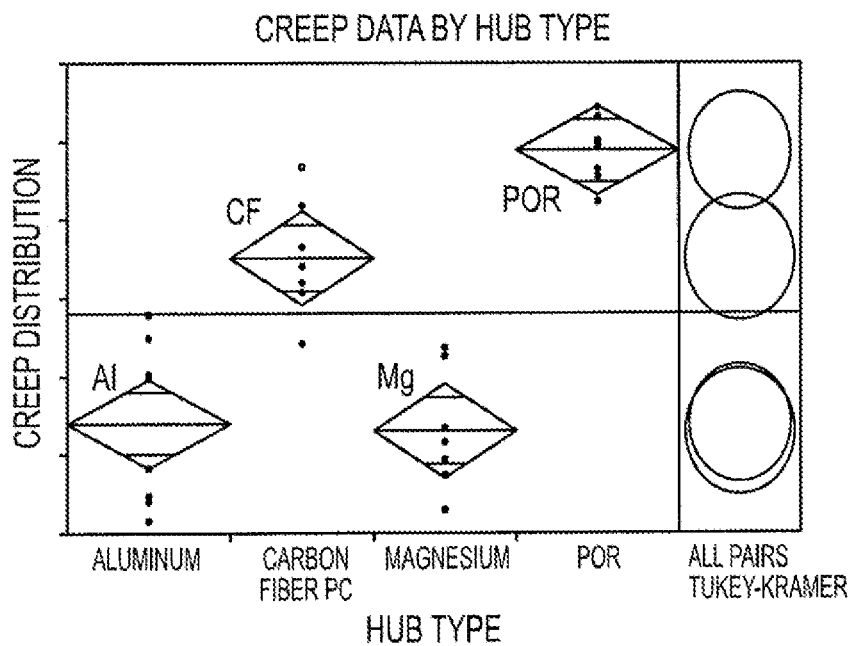
FIG. 7A is a plot of creep data for tape spools with different hub compositions.

FIG. 7A is a plot of tape width or creep data for tape spools made with different hub materials. Creep distribution measurements are shown on the vertical axis, in arbitrary units, based on measurements of the tape width end of tape (EOT) position, near the hub, as compared to the beginning of tape (BOT), outside the spool. The different hub materials are distributed along the horizontal axis, including aluminum or aluminum alloy (Al), carbon fiber (CF), magnesium or magnesium alloy (Mg), and an existing design point of reference (POR), for example a multi-piece plastic or other polymer-based tape spool and hub assembly.

Creep is a stability parameter, and may be defined as the viscoelastic change in tape width resulting from exposure to stress and strain, including tension and compression loading when wound on a tape spool. The creep distribution also depends on tape composition and environmental factors, including temperature and humidity. Across a wide range of operating conditions, however, changes in tape width are also related to the effective stiffness of the tape hub, and selection of a suitable elastic or tensile modulus with a corresponding effective stiffness can reduce or minimize creep (the change in tape width near the hub) in a wound tape pack.

TABLE 2

Creep Data (one-way ANOVA analysis)

| Hub Type | N | Mean (μm) | Std Error (μm) | Lower 95% (μm) | Upper 95% (μm) |
|---|---|---|---|---|---|
| Al | 8 | 1.397 | 0.273 | 0.836 | 1.958 |
| Carbon Fiber | 7 | 3.516 | 0.292 | 2.916 | 4.116 |
| Mg | 7 | 1.303 | 0.292 | 0.703 | 1.903 |
| POR | 6 | 4.883 | 0.273 | 4.322 | 5.444 |

The creep distribution data show the change in tape width from the BOT position to the EOT position for a wound tape pack. As shown in FIG. 7A, high stiffness hub materials such as aluminum (Al) and magnesium (Mg) are subject to substantially less creep than other designs, including carbon fiber (CF) and existing plastic or polymer (POR) designs. The significance of these results is demonstrated via the Tukey-Kramer method, based on a one-way analysis of the variance (ANOVA), as shown in Table 2.

Figure 7B:
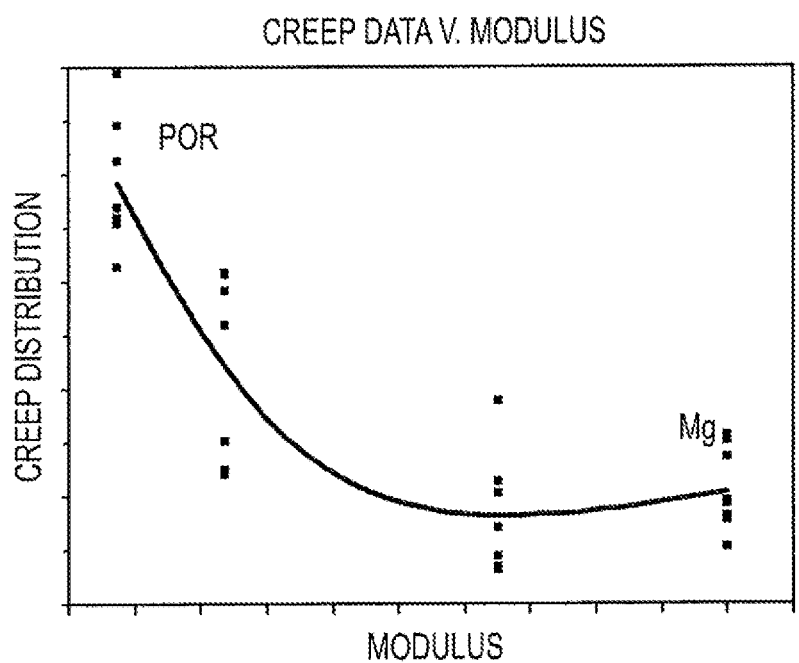
FIG. 7B is a plot of creep data as a function of hub material elastic modulus.

FIG. 7B is a scatter plot of creep data as a function of hub elastic modulus. The creep distribution measurements (vertical axis) are plotted against elastic or tensile modulus (e.g., Young's modulus) on the horizontal axis, with both given in arbitrary units. These data were generated from tests on different tape media, holding the geometry of the hub assembly constant and changing the material modulus.

As shown in FIG. 7B, tape creep generally decreases as a function of modulus, or effective hub stiffness, based on the mechanical properties of the material from which the hub is formed. For modulus values above about $10^6$ psi (about 6.9 GPa), for example, the hub cylinder and winding surface are subject to substantially less radial deformation than existing designs, as described above, resulting in substantially less creep. The data also show a continued decrease in creep for materials with elastic or Young's moduli above about $5 \times 10^6$ psi (about 34 GPa), which includes hubs made from aluminum and magnesium materials.

The unitary, high stiffness design of spool hub 14 thus reduces creep differential, as defined between the beginning of tape and end of tape positions. Unitary hub 14 also provides reduced variability in tension, as described above, providing a combination of greater transverse dimensional stability and tension control, reducing run-out and lateral tape motion (LTM) for improved position error signal (PES) capability.

The use of a high stiffness, unitary hub design also provides a more uniform winding surface, and allows for tighter manufacturing tolerances and correspondingly more uniform hub geometry. Materials such as magnesium and aluminum also provide higher effective radial stiffness, with better control of the hub geometry under compressive loading. Increased radial stiffness, in turn, reduces tape creep (or width expansion) and related (e.g., thickness) deformations of the tape when wound onto the hub over time.

Figure 8:
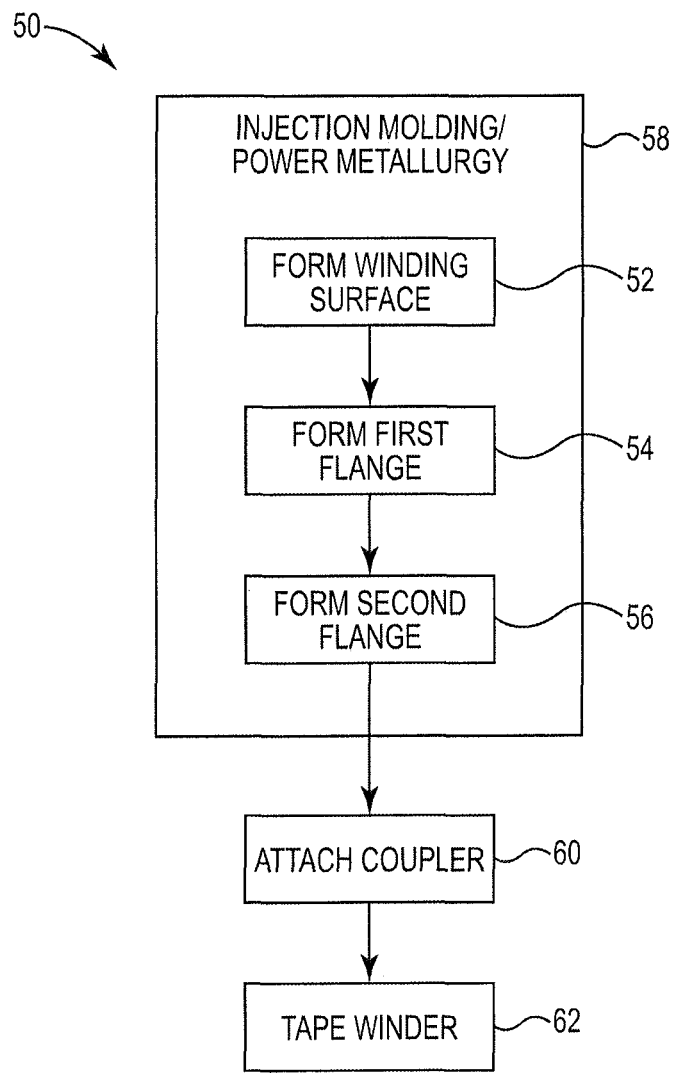
FIG. 8 is a block diagram of a method for making a tape spool.

FIG. 8 is a block diagram of method 50 for making a tape spool, for example spool assembly 12 as described above. Method 50 may include one or more steps including, but not limited to, forming a substantially cylindrical tape winding surface (step 52), forming a first flange with (step 54) extending radially from the first end of the tape winding surface, and forming a second flange (step 56) extending radially from the second end of the tape winding surface.

Forming the tape winding surface (step 52) may be performed by forming a substantially cylindrical hub component, extending axially from a first end to a second end. The tape winding surface is defined as the radially outer surface of the hub cylinder.

Forming the first flange (step 54) may include forming the second flange to extend from a radially inner diameter to the first end of the winding surface, and from the first end of the winding surface to a major radius of the tape spool. Forming second flange (step 56) may include forming the second flange to extend from the second end of the winding surface to the major diameter of the tape spool.

The tape winding surface, the first flange, and the second flange may be co-formed as a unitary structure from a metal material, where the metal material has an elastic modulus of at least about five million psi. In some designs, the metal material comprises magnesium, aluminum, steel, another high stiffness metal with a high elastic or tensile modulus, or combinations of these, as described above.

In some applications, method 50 includes co-forming the winding surface and the first and second flanges by injection molding (step 58) of the metal material. Alternatively, a powder metallurgy, sintering, rapid machining process, traditional machining process, or combinations of these may be used.

In additional applications, method 50 includes attaching a coupling element or rotational coupler (step 60) to the first flange. The coupling element comprising magnetic and mechanical coupling elements for rotational coupling of the tape winding surface to a tape drive. In further applications, method 50 includes winding a magnetic tape (step 62) onto the winding surface.

In the foregoing description, various embodiments of the invention have thus been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. An assembly comprising:
a substantially cylindrical tape winding surface extending along an axis from a first end to a second end;
first and second flanges, the first and second flanges extending radially from the first and second ends of the tape winding surface, respectively; and
an insert extending through an inner radius of the first flange, the insert includes a coupling element having a plurality of toothed portions,
wherein the tape winding surface and the first and second flanges are integrated as a unitary hub structure, and the tape winding surface includes a material having a Young's modulus larger than one million psi,
wherein an outer periphery of each of the first flange and the second flange does not include a gear portion,
wherein the first and second flanges and the insert are not detachable from the tape winding surface, and
wherein the tape winding surface is configured to have a maximum radial deformation of less than about 0.001 inch between the first end and the second end when the tape winding surface receives a compressive load of at least about 500 psi from a tape.

2. The assembly of claim 1, wherein the unitary hub material has a Young's modulus of at least about five million psi.

3. The assembly of claim 1, wherein the unitary hub material comprises an injection molded metal.

4. The assembly of claim 3, wherein the injection molded metal comprises magnesium.

5. The assembly of claim 3, wherein the injection molded metal comprises aluminum.

6. The assembly of claim 3, wherein the injection molded metal comprises titanium.

7. The assembly of claim 1, wherein the insert is configured for rotational coupling to a tape drive.

8. The assembly of claim 7, further comprising a magnetic clutch component coupled to the insert.

9. The assembly of claim 8, further comprising a cavity extending from the axis to an inner radius of the winding surface at the second end.

10. The assembly of claim 1, further comprising a tape wound onto the winding surface between the first and second flanges.

11. The assembly of claim 3, wherein the injection molded metal includes at least one of a nickel-based metal and a nickel-based metal alloy.

12. The assembly of claim 7, wherein a plurality of circle portions are provided among the plurality of toothed portions in the coupling element.

13. A tape spool comprising:
a substantially cylindrical hub defining a winding surface;
a first flange extending radially from a first end of the hub;
a second flange extending radially from a second end of the hub; and
an insert extending through an inner radius of the first flange, the insert includes a coupling element having a plurality of toothed portions,
wherein the winding surface and the first and second flanges are integrated as a unitary hub structure for the tape spool,
wherein the winding surface includes a material having a Young's modulus larger than one million psi,
wherein an outer periphery of each of the first flange and the second flange does not include a gear portion,
wherein the first and second flanges and the insert are not detachable from the hub, and
wherein the tape winding surface is configured to have a maximum radial deformation of less than about 0.001 inch between the first end and the second end when the tape winding surface receives a compressive load of at least about 500 psi from a tape.

14. The tape spool of claim 13, wherein the metal material has an elastic modulus of at least about five million psi.

15. The tape spool of claim 14, further comprising a tape wound onto the winding surface, wherein the tape generates a compressive force of at least about 500 psi on the hub.

16. The tape spool of claim 13, further comprising:
a magnetic washer coupled to the first flange; and
a cavity defined in the second end of the hub, the cavity extending from an axis of the tape spool to the second flange at an inner radius of the hub.

17. A tape cartridge comprising the tape spool of claim 15.

18. A method comprising:
forming a substantially cylindrical tape winding surface extending along an axis;
forming a first flange with the tape winding surface, the first flange extending radially from a first end of the tape winding surface;
forming a second flange with the tape winding surface, the second flange extending radially from a second end of the tape winding surface; and
forming an insert extending through an inner radius of the first flange, the insert includes a coupling element having a plurality of toothed portions,
wherein the tape winding surface and the first and second flanges are integrated as a unitary structure, the tape winding surface includes a material having a Young's modulus larger than one million psi,
wherein an outer periphery of each of the first flange and the second flange does not include a gear portion, wherein the first and second flanges and the insert are not detachable from the tape winding surface, and wherein the tape winding surface is configured to have a maximum radial deformation of less than about 0.001 inch between the first end and the second end when the tape winding surface receives a compressive load of at least about 500 psi from a tape.

19. The method of claim 18, further comprising forming the winding surface and the first and second flanges by injection molding of the metal material.

20. The method of claim 19, wherein the coupling element comprising magnetic and mechanical coupling elements for rotational coupling of the tape winding surface to a tape drive.

* * * * *